United States Patent
Van Dine et al.

(10) Patent No.: US 6,847,145 B2
(45) Date of Patent: Jan. 25, 2005

(54) ENCAPSULATED PERMANENT MAGNET MOTOR ROTOR

(75) Inventors: Pieter Van Dine, Mystic, CT (US); Alberto Franco, Niantic, CT (US); Spyro Pappas, Fort Lee, NJ (US); Mervin Laparre, Preston, CT (US)

(73) Assignee: Electric Boat Corporation, Groton, CT (US)

( * ) Notice: Subject to any disclaimer, the term of this patent is extended or adjusted under 35 U.S.C. 154(b) by 44 days.

(21) Appl. No.: 10/157,423

(22) Filed: May 29, 2002

(65) Prior Publication Data

US 2003/0222514 A1 Dec. 4, 2003

(51) Int. Cl.$^7$ ............................................. H02K 21/12
(52) U.S. Cl. ............................ 310/156.59; 310/156.48; 310/43; 310/156.61
(58) Field of Search ................. 310/43, 156.12–156.15, 310/156.23, 156.18, 156.48–156.65

(56) References Cited

U.S. PATENT DOCUMENTS

| | | | |
|---|---|---|---|
| 3,577,024 A | * 5/1971 | Inagaki et al. | 310/54 |
| 4,126,933 A | * 11/1978 | Anderson et al. | 310/43 |
| 4,171,238 A | * 10/1979 | Sadler et al. | 156/173 |
| 4,674,178 A | * 6/1987 | Patel | 310/43 |
| 4,910,861 A | 3/1990 | Dohogne | |
| 4,973,872 A | 11/1990 | Dohogne | |
| 5,122,704 A | 6/1992 | Blakeley et al. | |
| 5,200,662 A | * 4/1993 | Tagami et al. | 310/43 |
| 5,488,260 A | * 1/1996 | Heyraud | 310/42 |
| 5,727,307 A | 3/1998 | Gstöhl et al. | |
| 5,952,755 A | * 9/1999 | Lubas | 310/156.19 |
| 6,069,421 A | * 5/2000 | Smith et al. | 310/43 |
| 6,104,115 A | * 8/2000 | Offringa et al. | 310/156.28 |
| 6,150,747 A | * 11/2000 | Smith et al. | 310/43 |
| 6,242,833 B1 | 6/2001 | Mobius et al. | |

* cited by examiner

*Primary Examiner*—Karl Tamai
*Assistant Examiner*—Yahveh Comas
(74) *Attorney, Agent, or Firm*—Howrey Simon Arnold & White, LLP; Michael J. Bell

(57) ABSTRACT

Encapsulation of a permanent magnet rotor is achieved by applying a glass roving material to spaces in the rotor structure, applying a veil cloth around the outer surface of the rotor, mounting a vacuum bag with vacuum ports around the outer surface of the rotor, removing vent plugs from the end walls of the rotor and screws from an inner ring of the rotor and replacing them with vacuum ports and applying a vacuum to the vacuum ports. After air has been removed from the rotor, an encapsulating resin is applied to some of the ports to introduce resin into the interior of the rotor. After curing of the resin the vacuum bag is removed and the outer surface of the rotor is machined to the desired outer dimension of the rotor.

8 Claims, 6 Drawing Sheets

ENCAPSULATED PERMANENT MAGNET MOTOR ROTOR

BACKGROUND OF THE INVENTION

This invention relates to encapsulated rotors for permanent magnet motors which are exposed to liquids.

Many conventional arrangements for protecting permanent magnet motor rotors from intrusion of liquids require the rotor to be sealed in a metallic can which interferes with magnetic flux passing from the rotor to the surrounding stator. Other arrangements encapsulate the rotor in a resin material but such arrangements are often costly and introduce impact resistance problems. In addition, the installation and inspection of a rotor encapsulated in a conventional manner is difficult and if the rotor is encapsulated in an unreinforced resin the encapsulation is subject to cracking and has a limited life in an erosive environment.

The patent to Blakely et al. U.S. Pat. No. 5,122,704 discloses a composite rotor sleeve for preventing flow of liquid from the interior of a liquid-cooled rotor into a gap between the rotor and the stator. That sleeve includes an inner layer which is a continuous film of polyimide material in the form of a helically wound ribbon sealed with polyimide adhesive and a covering layer formed with a plurality of plies of wound fibrous material such as carbon fiber, each ply being impregnated in a resin matrix. Preferably eight of the plies are wound generally circumferentially to provide hoop strength and four other plies are wound at an angle to prevent generation of thermally induced stresses or relative movement between the sleeve and the rotor.

The patent to Smith U.S. Pat. No. 6,069,421 discloses an electric motor having a composite encapsulated rotor in which permanent magnets and pole pieces are encased in a canning layer of high strength resin containing high modulus fibers such as fiberglass combined with a metallic backing ring on the side away from the magnetic flux field extending between the rotor and the stator. In the Dohogne U.S. Pat. No. 4,973,872, a rotor assembly has a plurality of magnets and is encapsulated by an outer molded plastic cylindrical sleeve having runners which extend into channels in the rotor core. The plastic sleeve may be a fiberglass-filled plastic material.

In the Möbius et al. U.S. Pat. No. 6,242,833 a permanent magnet rotor may be made by winding fibers such as Kevlar, carbon or glass fibers around magnets supported on a core and filling the resulting layer of fibers with a resin.

SUMMARY OF THE INVENTION

Accordingly, it is an object of the present invention to provide an encapsulated permanent magnet motor rotor which overcomes disadvantages of the prior art.

Another object of the invention is to provide encapsulated permanent magnet motor rotors which are inexpensive and can resist impact and erosion while providing the capability of controlling flow of liquid through the space between the rotor and an adjacent stator.

A further object of the invention is to provide a method for encapsulating permanent magnet motor rotors which facilitates inspection during encapsulation.

These and other objects of the invention are attained by providing a method and an encapsulated permanent magnet motor rotor arrangement in which gaps in the periphery of the rotor containing pole pieces and permanent magnets are filled with fiber roving and a veil cloth is wrapped around the outer diameter of the rotor and the rotor components are infused with resin and then cured.

In a preferred method for preparing an encapsulated permanent magnet rotor the rotor is assembled by securing angularly spaced pole pieces to an inner ring with permanent magnets disposed between the pole pieces. Preferably the magnets are held in place by wedges interengaging the adjacent pole pieces and gaps between the rotor components are filled with fiber roving, after which a veil cloth is wrapped around outer diameter of the rotor and the rotor is infused with resin. After solidification of the resin the rotor is machined to provide a smooth outer surface and a wrap layer, which is a fiber-reinforced organic or inorganic polymer composite, is applied to the outer diameter for protection against impact and erosion.

The rotor, including the fiber roving and the veil cloth applied to the outer surface of the rotor, are filled with a clear plastic resin by drawing a vacuum through vacuum ports communicating with the interior of the rotor while it is sealed in a vacuum bag and drawing encapsulated resin into the interior of the rotor while the vacuum is applied, then curing the resin and removing the vacuum bag, after which the outer surface is machined to a cylindrical shape. Thereafter, another layer of veil cloth saturated with resin is applied followed by a wet wound spiral fiber wrap over the outer surface which is then cured and machined to the final desired rotor outer diameter. If desired, the outer surface of the encapsulation can be contoured to promote or inhibit liquid flow through the gap between the rotor and a surrounding stator.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
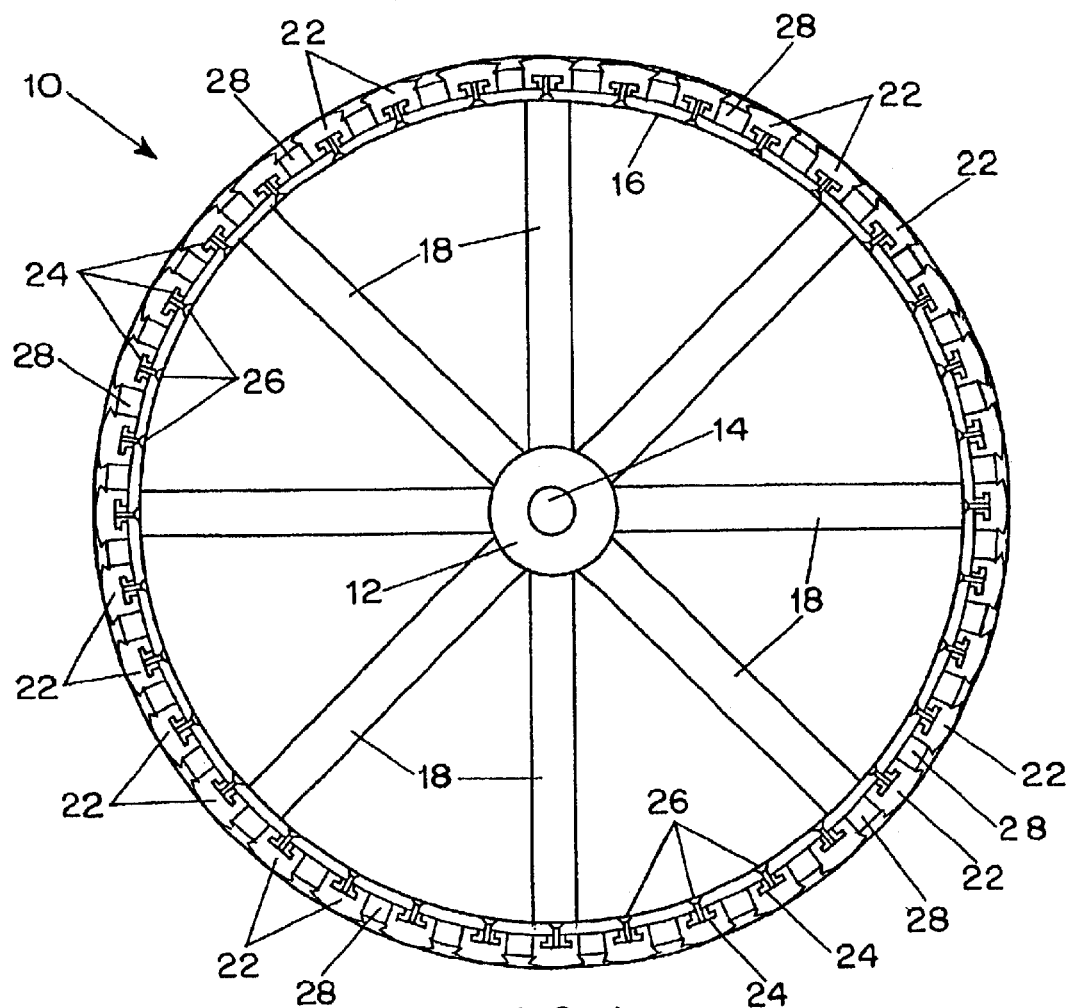
FIG. 1 is an end view illustrating a representative embodiment of a permanent magnet motor rotor.
Figure 2:
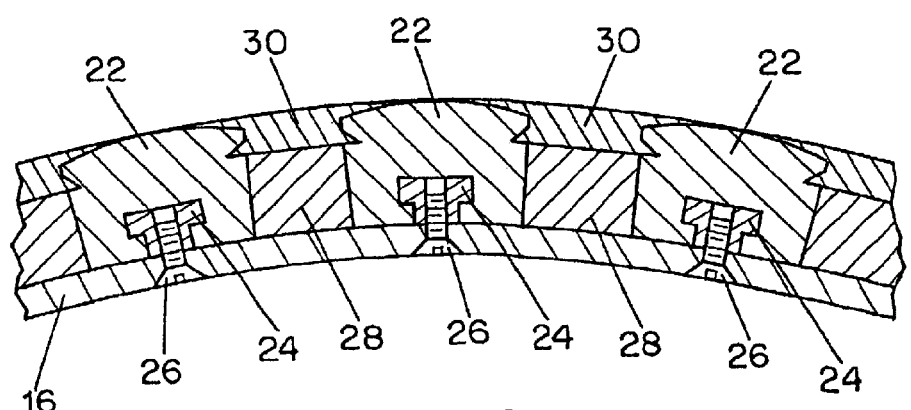
FIG. 2 is a fragmentary enlarged cross sectional view illustrating the mounting of pole pieces and magnets on the motor rotor of FIG. 1.
Figure 3:
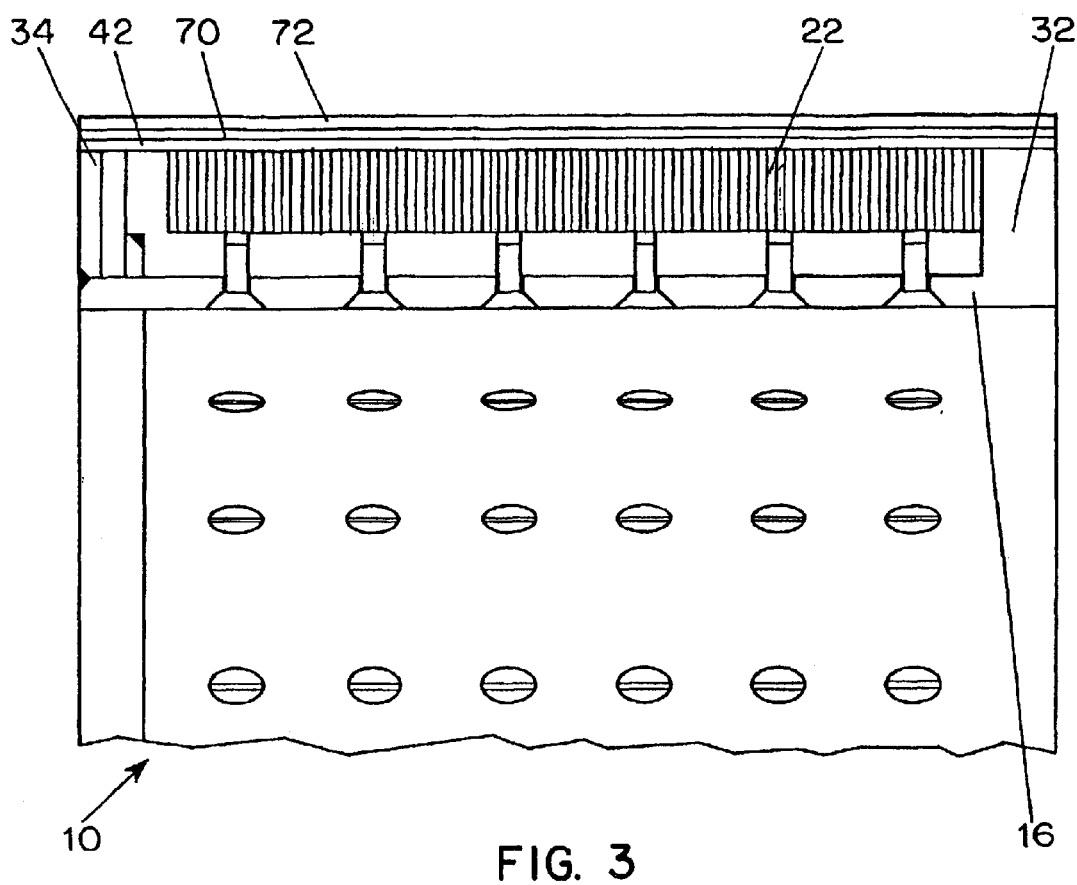
FIG. 3 is a fragmentary view in longitudinal section showing the encapsulated rotor.

In the typical embodiment of the invention shown in FIGS. 1–3, a rotor 10 has a hub 12 supported on a shaft 14 and an inner ring 16 supported by spokes 18 from the hub 12. An array of magnetic pole pieces 22, circumferentially distributed around the periphery of the rotor, are affixed to the rotor inner ring 16 by pole retainers 24 held by removable seal members such as screws 26 extending through the inner ring 16.

Between each adjacent pair of pole pieces 22 a permanent magnet 28 is retained in place radially by a non-magnetic wedge member 30 having edges shaped to form an interlocking engagement with the adjacent pole pieces 22 disposed on opposite sides of the magnet 28 and engaging the radially outer surface of the magnet.

Figure 4:
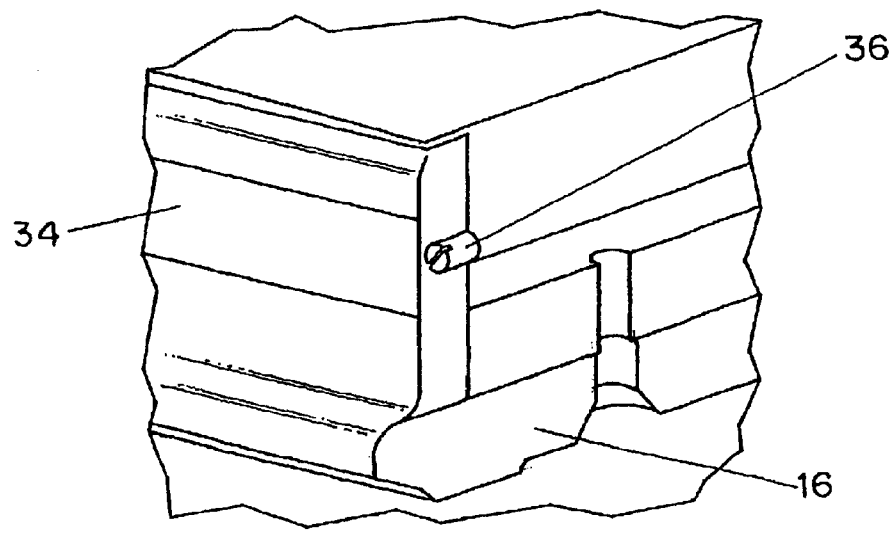
FIG. 4 is a fragmentary perspective view showing a vent plug in an end wall of the rotor.
Figure 5:
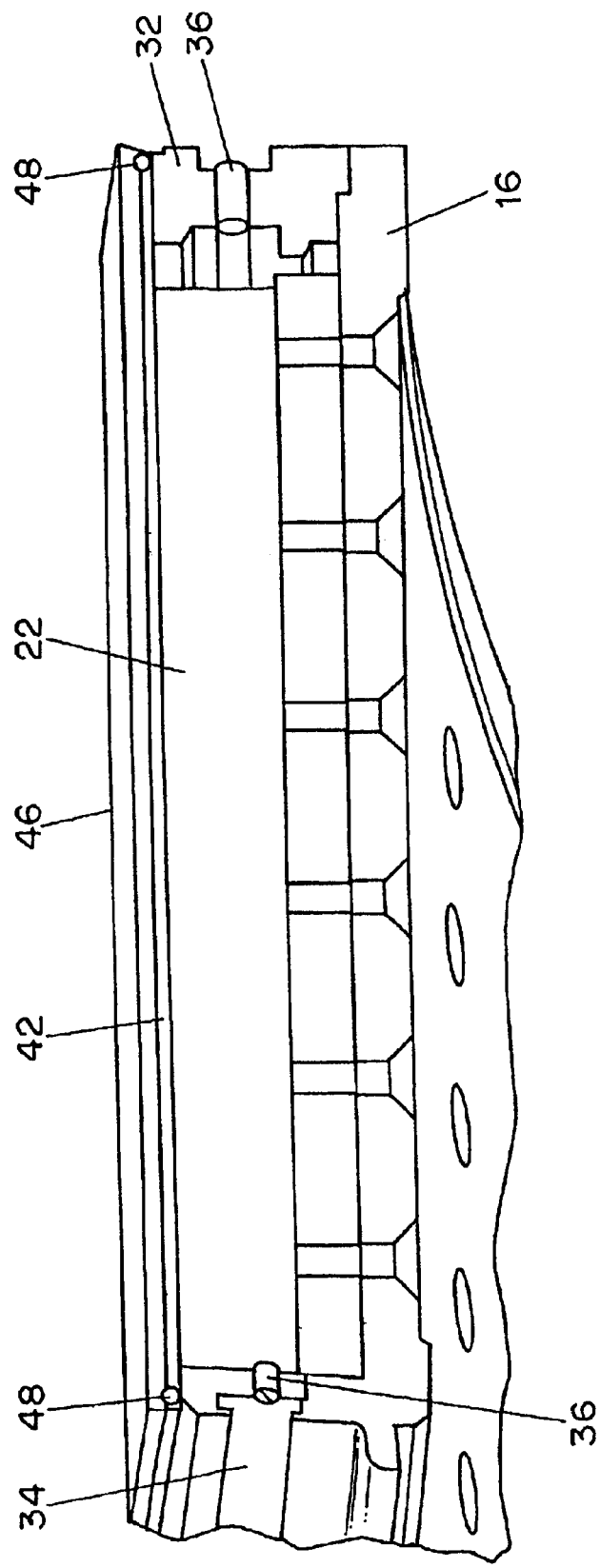
FIG. 5 is a perspective view illustrating the application of a vacuum bag to the outer surface of the rotor.

As shown in FIG. 3 the pole pieces 22 and magnets 28 are retained in the axial direction of the rotor at one end of the inner ring 16 by a shoulder 32 at one end and at the opposite ends by a rotor closure plate 34 welded to the rotor inner ring. As best seen in the fragmentary views of FIGS. 4 and 5, the shoulder 32 and the closure 34 are provided with removable seal members such as vent plugs 36 which are distributed angularly around the ends of the rotor.

Figure 6:
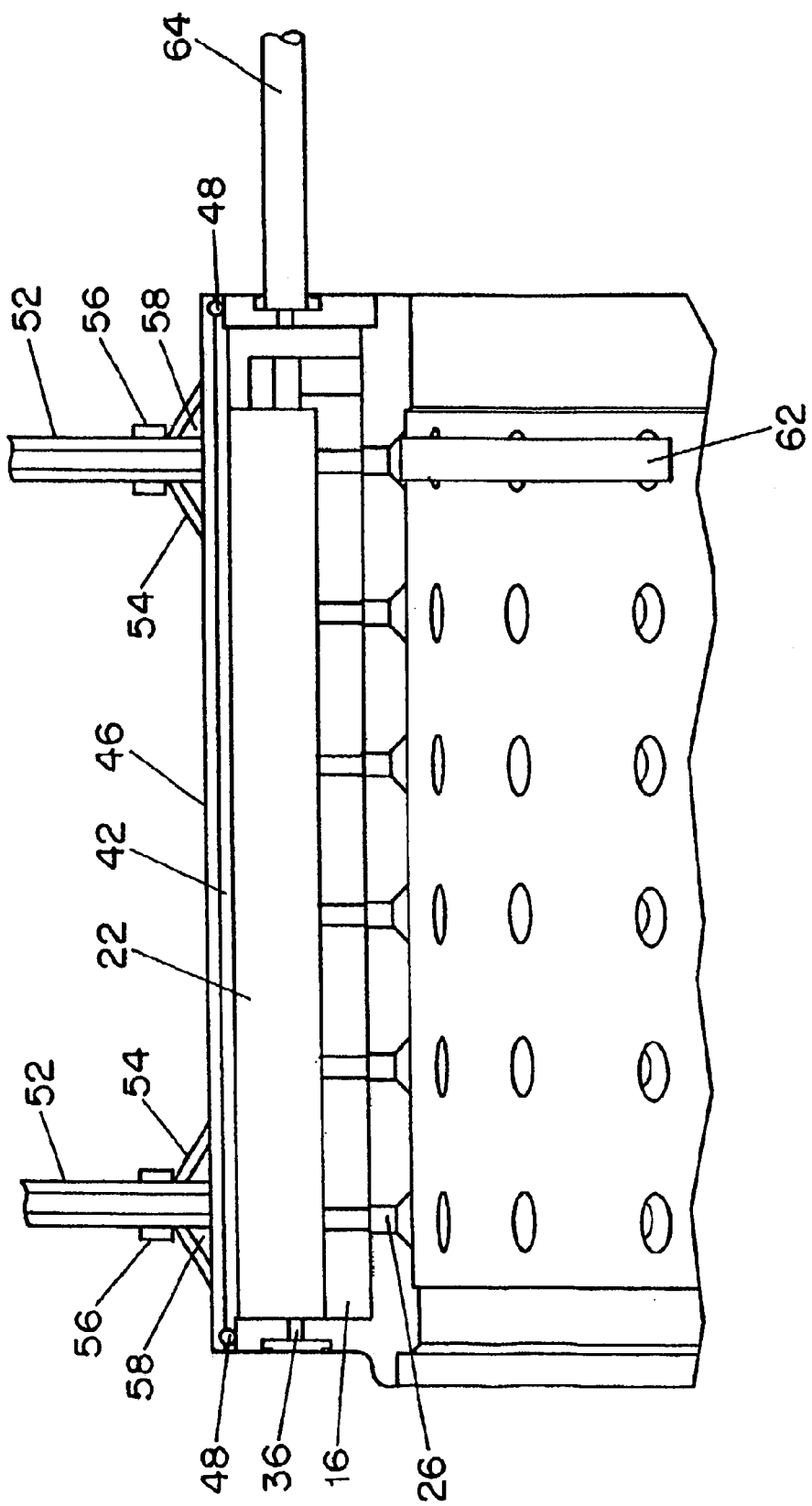
FIG. 6 is a view similar to FIG. 3 showing a representative arrangement for injecting resin material into the rotor for encapsulation.
Figure 7:
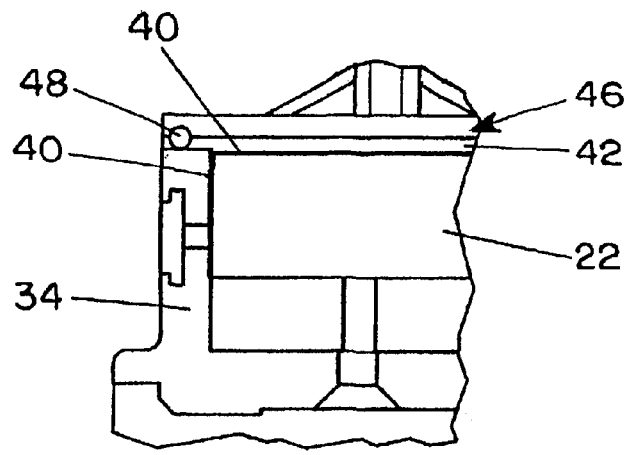
FIGS. 7, 8 and 9 are enlarged fragmentary views showing portions of the arrangement illustrated in FIG. 6.
Figure 8:
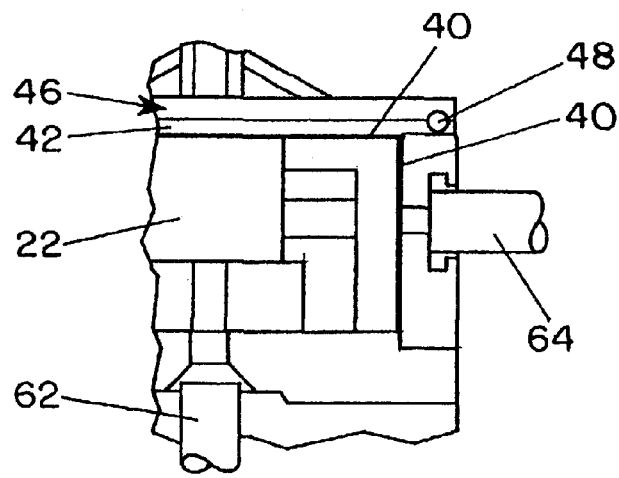
Figure 9:
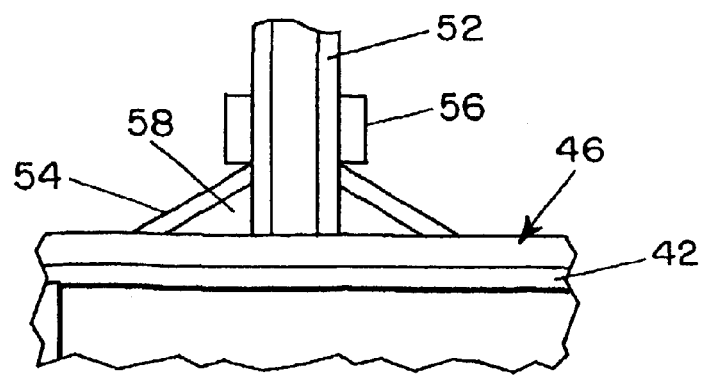

In order to encapsulate the rotor, any gaps between the pole pieces 22 and the adjacent wedges 28 and around the periphery of the rotor at each end are first filled with an aramid, glass or other inorganic roving 40 as illustrated in FIGS. 7 and 8. Thereafter, a first veil cloth 42, made of glass, aramid, carbon, polyester or quartz fibers, is wound around the periphery of the rotor and a transparent vacuum bag 46 shown in FIGS. 5–8, is applied to the periphery of the rotor and sealed by seal strips 48 to the edges of the rotor. As best seen in FIG. 9, the vacuum bag 46 has vacuum ports 52 secured by washers 54 and nuts 56 and a sealing compound 58 to assure an air tight connection to the rotor surface.

As also shown in FIGS. 6 and 8, selected ones of the screws 26 constituting removable seal members in the inner ring 16 of the rotor located at 30 degree intervals around the interior of the ring are removed and replaced by vacuum ports 62. In addition, selected vent plugs 36 constituting removable seal members are removed from one or both of the end walls of the rotor and replaced by further vacuum ports 64.

Although FIG. 6 illustrates each of the vacuum ports 52, 62 and 64 at only a single angular location around the periphery of the rotor, it will be understood that arrays of such ports are, in each instance, provided at locations distributed angularly around the periphery of the rotor, preferably at equally spaced angular locations such as every 30°. In addition, the location of the vacuum ports through which resin will be introduced into the rotor as described hereinafter are preferably located intermediate between the other ports for example, by being spaced therefrom by 15° if the angular spacings between the ports is 30°.

Next a vacuum is applied to at least some of the vacuum ports 52, 62 and 64 to draw the vacuum bag 46 into tight engagement with the periphery of the rotor and air is thereby removed from the rotor. During this step the rotor may be heated slightly, to 100° F., for example, while the vacuum is maintained to drive off any moisture and then cooled to ambient temperature. In the typical example shown in FIG. 6, the vacuum ports 52 are used as resin supply ports. Accordingly, in this example, after evacuation and with the vacuum still applied to the vacuum ports 62 and 64, encapsulating resin which may, for example be a vinyl ester resin such as Dow Derekane 470, is introduced into the ports 52.

After the encapsulating resin has been drawn from the ports 52 to which it is supplied through the veil cloth 42 and the roving 40 and enters the other vacuum ports 62 and 64 to which a vacuum is being applied, each of the vacuum ports is closed as soon as the resin starts flowing into it and, when all of the vacuum ports have been closed, the supply of resin is discontinued. The periphery of the rotor is then inspected visually through the transparent vacuum bag 46 for dry spots. If any dry spot is observed, vacuum is applied to the nearest vacuum port and resin is applied to the nearest resin supply port 52 on the opposite side of the dry spot so that resin is drawn through the dry area to the open vacuum port. When the rotor has been completely filled with resin, the resin is cured and the vacuum bag, the resin supply ports 52 and threaded vacuum ports 62 and 64 are removed from the rotor and the screws 26 and vent plugs 36 which constitute sealing members are replaced using a sealant to assure a liquid-tight seal. The vent plugs 36 may then be ground smooth with the adjacent end wall surfaces if desired.

The peripheral surface of the rotor containing the resin-filled veil cloth 42 is then machined to provide a uniform cylindrical outer surface. As a result of the machining, rough fibers in the form of fuzz may be produced on the surface. Thereafter, as shown in FIG. 3, another veil cloth 70, also saturated with vinyl ester resin, is applied to the periphery of the rotor and a wet-wound spiral fiber wrap 72, preferably of E-glass vinyl ester is applied to the outer surface. After curing of these layers, the outer surface of the rotor is finished to produce the desired outer diameter.

Figure 10A:
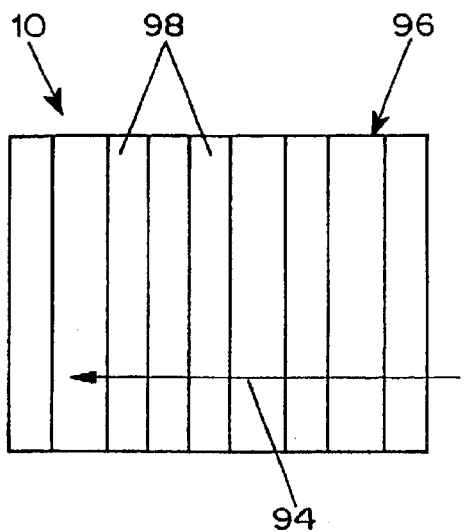
FIGS. 10A and 10B are plan and cross-sectional fragmentary views, respectively, illustrating a rotor having outer surface corrugations oriented to inhibit flow of liquid through the space between the rotor and the stator.
Figure 10B:
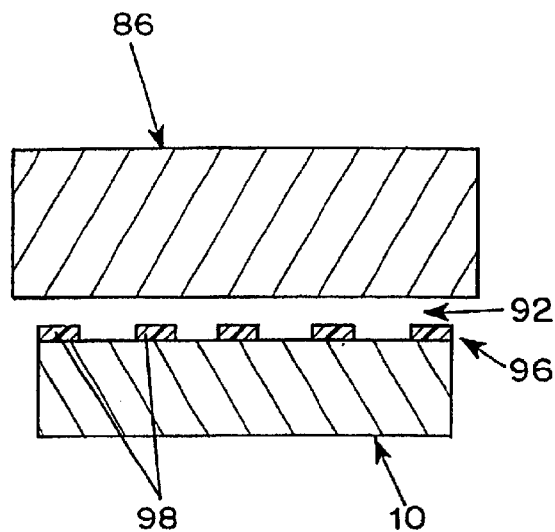

FIGS. 10A, 10B, 11A and 11B illustrate representative rotor outer surface configurations designed to control the flow of liquid through the space 92 between the exposed outer surface 96 of the rotor 10 and the inner surface of an adjacent stator 86. For this purpose, the outer surface 96 of the encapsulating layers 42, 70 and 72 may be shaped with projections arranged to promote or inhibit flow of liquid through the space 92. FIG. 10A is a plan view and FIG. 10B is a cross-sectional view of a portion of the outer surface 96 of the rotor which is formed with a corrugation pattern consisting of parallel ridges which extend circumferentially around the outer surface of the encapsulating layers so as to inhibit flow of liquid through the space 92 between the rotor 10 and the stator 86.

Figure 11A:
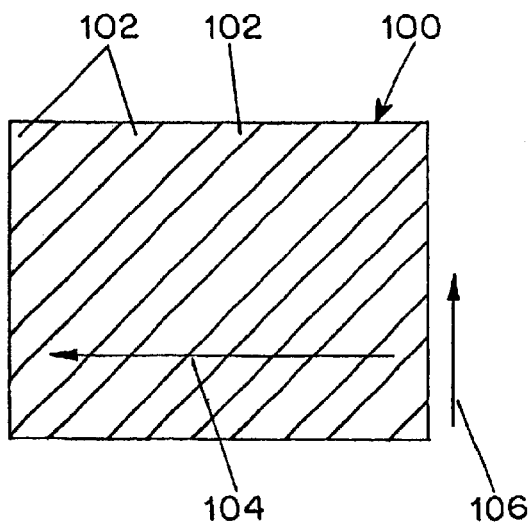
FIGS. 11A and 11B are plan and cross sectional views, respectively, illustrating a rotor having outer surface corrugations oriented to promote flow of liquid through the space between the rotor and a stator.
Figure 11B:
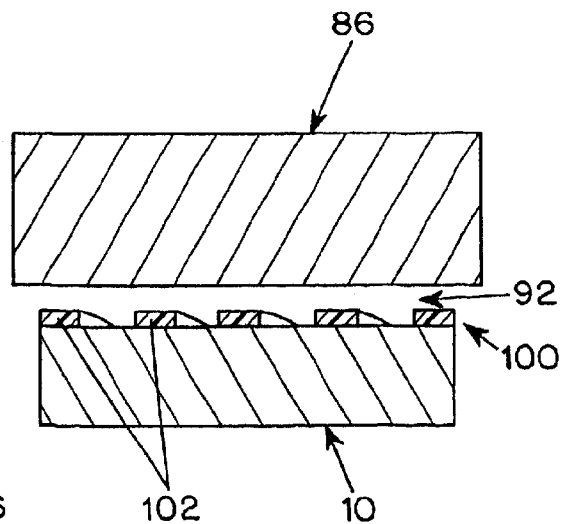

Another corrugation pattern, shown in FIGS. 11A and 11B, includes a series of parallel ridges 102 projecting from the outer surface 100 of the composite encapsulating layer which are oriented at an angle to the plane perpendicular to the axis of the rotor 10, thereby promoting flow of liquid in the direction 104 through the space 92 between the stator 86 and the rotor 10 as the rotor rotates in the direction 106. In this way the flow of liquid through the space 92, which provides cooling for the stator, can be manipulated and used as a design parameter. Because the encapsulating layers 42, 70 and 72 are made of fiber-reinforced rigid material, those components are resistant to damage and permit a small but accurate dimension of the space 92 between the rotor 10 and the stator 86 to be maintained during operation.

Although the invention has been described herein with reference to specific embodiments, many modifications and variations therein will readily occur to those skilled in the art. Accordingly, all such variations and modifications are included within the intended scope of the invention.

We claim:

1. A permanent magnet rotor arrangement comprising:
   a permanent magnet rotor including:
   an inner rotor ring;
   a plurality of magnetic pole pieces affixed to the inner rotor ring and angularly distributed around the periphery of the rotor ring;

a plurality of permanent magnets each supported between an adjacent pair of pole pieces;

an end wall at each end of the rotor;

a plurality of removable seal members in at least one of the inner rotor ring and the end walls of the rotor;

fibrous material engaging the pole pieces and interposed in spaces between pole pieces and adjacent components of the rotor;

encapsulating resin material infused into the fibrous material to encapsulate the rotor; and an outer layer of fibrous material impregnated with resin material providing a cylindrical outer surface for the rotor.

2. A permanent magnet rotor arrangement according to claim 1 wherein the cylindrical outer surface is formed with projecting corrugations arranged to control flow of liquid through a space between the rotor and an adjacent stator.

3. A permanent magnet rotor arrangement according to claim 2 wherein the corrugations extend in the circumferential direction of the rotor to inhibit flow of liquid through a space between the rotor and an adjacent stator.

4. A permanent magnet rotor arrangement according to claim 2 wherein the corrugations extend at an angle to the axis of the rotor to promote flow of liquid through a space between the rotor and an adjacent stator.

5. A permanent magnet rotor arrangement according to claim 1 wherein at least some of the plurality of removable seal members are in the end walls of the rotor and are angularly spaced at locations which permit application of a vacuum to draw encapsulating material into the interior of the rotor so as to fill spaces within the rotor.

6. A permanent magnet rotor arrangement according to claim 1 wherein at least some of the removable seal members are in the inner ring of the rotor and are positioned at locations permitting application of a vacuum to draw encapsulating resin into the interior of the rotor so as to fill spaces within the rotor.

7. A permanent magnet rotor arrangement according to claim 1 wherein the fibrous material engaging the pole pieces includes a veil cloth.

8. A permanent magnet rotor arrangement according to claim 1 wherein the fibrous material interposed in spaces between the pole pieces and other components includes fibrous roving.

* * * * *